United States Patent
Roberts

(10) Patent No.: US 7,060,210 B2
(45) Date of Patent: Jun. 13, 2006

(54) METHOD OF PROCESSING COLLOIDAL SIZE POLYTETRAFLUOROETHYLENE RESIN PARTICLES TO PRODUCE BIAXIALLY-ORIENTED STRUCTURES

(76) Inventor: Robert Roberts, 8781 SW. 108th St., Ocala, FL (US) 34481

( * ) Notice: Subject to any disclaimer, the term of this patent is extended or adjusted under 35 U.S.C. 154(b) by 0 days.

(21) Appl. No.: 10/810,763

(22) Filed: Mar. 26, 2004

(65) Prior Publication Data

US 2005/0212160 A1    Sep. 29, 2005

(51) Int. Cl.
*B29C 55/08*    (2006.01)
(52) U.S. Cl. .................... 264/49; 264/127; 264/146; 264/175; 264/210.7; 264/288.4; 264/290.2; 264/523
(58) Field of Classification Search ........... 264/211.12, 264/127, 175, 49, 290.2, 210.7, 288.4, 146, 264/523
See application file for complete search history.

(56) References Cited

U.S. PATENT DOCUMENTS

| | | | |
|---|---|---|---|
| 2,440,190 A | 4/1948 | Althan | |
| 2,752,637 A | 7/1956 | Walker et al. | |
| 2,936,301 A | 5/1960 | Thomas | |
| 3,003,912 A | 10/1961 | Harford | |
| 3,010,950 A | 11/1961 | Thomas | |
| 3,277,419 A | 10/1966 | Butz | |
| 3,556,161 A * | 1/1971 | Roberts ....................... | 264/41 |
| 3,766,133 A | 10/1973 | Roberts et al. | |
| 4,576,608 A | 3/1986 | Homsy | |
| 4,950,538 A | 8/1990 | Honda et al. | |
| 5,154,827 A | 10/1992 | Ashelin et al. | |
| 5,470,409 A | 11/1995 | Deakyne et al. | |
| 5,972,494 A | 10/1999 | Janssens | |
| 6,352,660 B1 | 3/2002 | Friedrich et al. | |
| 2004/0191525 A1 | 9/2004 | Roberts | |

* cited by examiner

*Primary Examiner*—Stefan Staicovici
(74) *Attorney, Agent, or Firm*—Saliwanchik, Lloyd & Saliwanchik

(57) ABSTRACT

This invention involves forward integration of the art paste extrusion process by adding a step to the processing sequence to change the uniaxially-oriented art form to a desirable planar biaxially-oriented form. This invention also involves the backward integration of the resin preparation to reduce the commercial coagulated dispersion resin particle size (average 500 micron) to the size range of colloidal size particles contained within the original 500 micron particle. In this small particulate form, the polytetrafluoroethylene (PTFE) resin can be blended more homogeneously and extruded with less turbulence in the plug extrusion process, the rheological mechanism of this extrusion process. The size reduction makes processing of micron size fillers possible in up to 90 percent volume of the PTFE resin. This invention also provides a direct and simple method of producing planar biaxially-oriented sheet and a source of resin formulations for fabricating other forms and shapes.

17 Claims, No Drawings

METHOD OF PROCESSING COLLOIDAL SIZE POLYTETRAFLUOROETHYLENE RESIN PARTICLES TO PRODUCE BIAXIALLY-ORIENTED STRUCTURES

BACKGROUND OF THE INVENTION

This invention relates to biaxially-oriented polytetrafluoroethylene ("PTFE") sheets and a method for processing sheet continuously or in reasonably long lengths and widths.

A method for processing PTFE sheet continuously or in reasonably long lengths and widths has been pursued for over 40 years. For instance, in 1961, two patents relating to a method for processing sheet continuously or in reasonably long lengths were issued, the Hartford U.S. Pat. No. 3,003,912 and the Thomas U.S. Pat. No. 3,010,950. However, neither process was eventually successful due to various processing problems and property deficiencies. Quality sheet was prepared in a batch process by Roberts U.S. Pat. No. 3,556,161 method, but only commercialized by Garlock, Inc. Palmyra, N.Y. The parts of the patent dealing with sheet manufacture and the parts of the patent commercialized by Garlock were abandoned by Dupont and therefore not protected by patent.

In 2003, Roberts filed a patent, which is now pending, which embodies a novel technology for producing planar biaxial oriented sheet on a continuous basis with lay-flat stress free qualities. This process does not require multiple pass calendering and fibered reinforcements can be added for true reinforcement.

Art process sheet today is fabricated by compression molding a cylinder, which must be batch sintered (fused), cooled and finally shaved (skived) in a lathe to obtain sheet. Although this process produces a sheet, the sheet will not lay flat, is randomly oriented and is not stress free. Additionally, this art process is not cost effective and is time consuming because filled sheet is costly and of limited quality.

The process of the present invention provides simple improvements over an old uniaxially-oriented art form for manufacturing tubing, tape, film or similar shapes taught in Walker U.S. Pat. No. 2,752,637. This invention utilizes art equipment to produce a uniaxially-oriented pressure coalescible extrudate from which biaxially-oriented sheet and shapes may be fabricated with qualities similar to both the Roberts 161 patent and his pending patent. The present invention can be extremely useful for fabricating many items. Only Roberts' pending patent is capable of processing long high aspect ratio fibers with fibrous PTFE resin to provide true reinforcement to fabricated products. The primary advantage over Roberts 161 is the elimination of multiple calendering steps, which entails more handling time and equipment.

Important changes in the traditional resin preparation procedure of the art process contained in the present invention significantly improves extrusion performance and surprisingly makes it possible to successfully extrude filled compositions, heretofore through to be impossible. Art process paste extrusion limits the amount of filling to very low percentages, up to 5 percent, which is adequate as a marker but is not physically functional and not generally used above 1 percent without interfering with product quality. Filling by the process of this invention can be achieved beneficially up to 90 percent by volume dependent upon the characteristics of the fillers or additives.

The relevant prior art includes the following patents:

| Patent No. (U.S. unless stated otherwise) | Inventor | Issue/Publication Date |
| --- | --- | --- |
| 3,003,912 | Harford | Oct. 10, 1961 |
| 3,010,950 | Thomas | Nov. 28, 1961 |
| 3,556,161 | Roberts | Jan. 19, 1971 |

SUMMARY OF THE INVENTION

The primary object of the present invention is to provide a method of processing colloidal size polytetrafluoroethylene ("PTFE") resin particles to produce biaxially-oriented structures.

Another object of the present invention is to provide a biaxially-oriented PTFE sheet made from uniaxially-oriented paste extrusion extrudate in the hydrostatic pressure coalescible state.

A further object of the present invention is to provide a method of forming a biaxially-oriented hydrostatic pressure coalescible sheet.

An even further object of the present invention is to provide a method of producing a biaxially-oriented sintered tube.

A further object of the present invention is to provide a biaxially-oriented tube containing fillers and/or additives.

An even further object of the present invention is to provide a process for reducing macro-size of commercial PTFE coagulated dispersion resin to the colloidal size of the particles contained within the coagulate.

An even further object of the present invention is to provide a method of preparing a porous biaxially-oriented PFTE composition.

Another object of the present invention is to provide a porous membrane structure of biaxially-oriented PTFE.

Another object of the present invention is to provide an asymmetric porous structure of biaxially-oriented PTFE.

The present invention fulfills the above and other objects by providing:

1) a method of processing colloidal size PTFE resin particles to produce biaxially-oriented structures wherein one takes a uniaxially-oriented paste extrusion extrudate in the hydrostatic pressure coalescible state and applying a means of stress on the uniaxially-oriented paste extrusion extrudate at approximately 90 degrees to the original extrusion direction;

2) a method of forming a biaxially-oriented hydrostatic pressure coalescible sheet wherein one takes a biaxially-oriented hydrostatic pressure coalescible sheet and applies a means of force to form a complex shape;

3) a process for reducing macro-size of commercial PTFE coagulated dispersion resin to the colloidal size of the particles contained within the coagulate by suspending the colloidal size PTFE particles in a wetting liquid wherein the colloidal size polytetrafluoroethylene resin in the hydrostatic pressure coalescible condition is in biaxially-oriented form and producing blends of the colloidal particles;

4) a method of preparing a porous biaxially-oriented PTFE composition wherein one adds fugitive materials as fillers and sinters the composition;

5) a porous membrane structure of biaxially-oriented PTFE with void content up to 90 percent; and 6) an asymmetric porous structure of biaxially-oriented PTFE.

The above and other objects, features and advantages of the present invention should become even more readily apparent to those skilled in the art upon a reading of the following detailed description of the embodiments of the present invention.

DESCRIPTION OF THE INVENTION

The preparation of the resin and/or feed components prior to extrusion is an important feature of this novel method of manufacturing planar biaxially-oriented sheet and shapes.

This first step comprises the freeing of the colloidal particles from the coagulation particle aggregate by cutting the aggregate in a wetting liquid. It is most important that the cutting action take place in a liquid, which readily wets or spreads on the fluoropolymer surfaces. Defined as a liquid whose contact angle is as near zero as possible when in contact with a fluoropolymer surface, Isopar H, a hydrocarbon, is such a liquid and is available from Exxon®. Once this liquid penetrates the agglomerate skin, it passes freely between the colloidal size particles, by capillarity, to lubricate their surfaces and make each colloidal particle able to move freely and substantially independently. Cutting the aggregate size particle skin, wherein the average size of each particle is 500 microns, is important to enable the colloidal size particle release and permit the free movement of these primary colloidal size particles, which average 0.2 microns in size. The smaller size particle allows a much more homogenous and intimate movement of particles and especially permits the incorporation of micron size fillers and additives previously prohibitive by the art process. Paste extrusion is best accomplished where flow in the extrusion barrel and die is streamlined to eliminate turbulence and mixing, ideally defined Theologically as plug flow. In the past, the wide range of much larger size particles and their containers (skins) plus fillers did not fit this model.

In the cutting step 1 part of coagulated dispersion, resin is added to 20 parts of a wetting liquid, such as Isopar H or the like, at ambient temperature. The mixture is stirred at a peripheral tip speed of 2000 feet per minute for 1 minute. This is sufficient time to release the colloidal particles and reduce the average particle size of the aggregate to about 10 microns. If the composition is to include fillers and/or additives they may be added first wherein usually 15 seconds of cutting is sufficient to disperse them after which the coagulated dispersion is added and cut for 1 minute. The resin or solids mixture is then poured into a vacuum filtering device and the liquid phase removed until 18 percent liquid remains with the solids. Covering the filter cake with a sheet of rubber sheet and pressing will aid in keeping the liquid content uniformly distributed and prevent air leakage around edges of the filter cake. The solids are then loaded into the extruder barrel for extrusion. The material should be compressed slowly before extrusion begins to allow entrapped air to escape and the solids to consolidate. After the extruder is loaded, the extrusion proceeds as a normal art extrusion would. Once the hydrostatic coalescible extrudate is formed to a predetermined length, the uniaxially-oriented extrudate is ready for rolling in the transverse direction (i.e. 90 degrees to the initial extrusion direction).

The force required to roll the pressure-coalescible extrudate exit the extruder is very low; the weight of the steel roll employed alone should be sufficient weight to apply the needed force. The extrudate should be protected exit the extruder so that the lubricant remaining in the extrudate does not escape by evaporation. When the desired length is extruded, the tube is cut longitudinally in a straight line from one end to the other. The cut tube is then laid on a flat smooth surface. A smooth surface roll, preferably slightly larger than the O.D. of the tube just extruded, is laid parallel to its length. A strip of metal (thickness spacer), preferably the thickness of the desired sheet and slightly longer than the expected sheet width, is laid at either end of the length of tubing to be rolled. Once the set-up is in place, the roll is placed over the sheet directed 90 degrees to the extrusion direction. The extrudate is then rolled until limited in compression by the thickness of the metal spacer strips at its ends. In rolling, a rectangular shaped sheet will develop. When the stress produced by rolling is equal to the stress imparted by paste extrusion, the physical properties in the longitudinal and transverse directions will become essentially equal. The rectangular sheet, when dried and sintered, will display planar biaxial orientation.

In a similar fashion, tubing extruded uniaxially can be transformed to be oriented biaxially by rolling the extrudate normal to the extrusion direction a sufficient amount to balance the stresses introduced longitudinally. Also, sheet extrudate extruded uniaxially may be calendered or rolled normal to its extrusion direction to produce planar biaxially-oriented sheet. As long as the hydrostatic condition remains with the extrudate, it may be worked to adjust the orientation.

Laminant constructions can be made during the original tubing extrusion by hand rolling a strip of the desired composition from the filter cake in a uniaxial direction with enough force to provide coherence to the composition. The resultant strip is wound around the extrusion mandrel until the mandrel and wound layers fit snuggly into the extrusion barrel. The wound layers may be made of different compositions. Since flow in the extrusion will be plug type, the layers will be in exactly the same order in the extrudate as in the wound lay up.

Sections of the biaxially-oriented sheet prior to the removal of lubricant may be used to form shapes, which will be stable and display little to no shrinkage in the length and width dimensions after sintering, although the major shrinkage will occur in the thickness.

To produce a laminated structure, the uniaxial extrudate of sheet extrusions may be placed one over the other and rolled together in the transverse rolling operation. Application of heat below 300 degrees Centigrade will aid in the merging process. The resulting laminant will be oriented planar biaxial when the amount of stress from rolling equals the stress introduced on extrusion.

In conclusion, introducing orientation to unsintered hydrostatic coalescible extrudate is much easier and more effective than attempting to biaxially orient sheet made from either melt processable or compression moldable resin types.

The elements of this invention are expressed and illustrated further by the following examples however, their scope should not be construed as limiting.

EXAMPLE I

This example demonstrates the art method of preparing coagulated dispersion resin for paste extrusion and its effect on the quality of the finished product.

Eighteen percent of a wetting lubricant is added to the charge of polytetrafluoroethylene coagulated dispersion resin required to fill the extrusion barrel. In addition, one percent carbon black is added to the lubricant as a marker to coat the surface of each coagulated dispersion particle. These ingredients are gently tumbled at ambient temperature for about 1 hour and then allowed to stand 4 to 6 hours before charging to the extruder barrel. The lubricated resin is added uniformly to the extrusion barrel and low pressure is applied at a slow rate of compaction to allow entrapped air to escape and to consolidate the charge. The extrusion is initiated and processed in the usual fashion; the extrudate is dried and finally sintered. Microscopic examination of microtomed sections of longitudinal and transverse lengths reveals a carbon black outline of each coagulated dispersion particle domain. The longitudinal section reveals elongated lancet shaped domain areas while the transverse domains are elliptical to essentially round.

Electron microscope observations of a fractured unsintered extrudate show the dispersion particles as discrete, essentially round particles, within a carbon black envelope, with no dispersion particle distortion.

It is obvious that there is no intermixing of particulate matter and not surprising that fillers and additives cannot mix readily and intimately in a composition made by this process.

EXAMPLE II

This example demonstrates the special features of this invention that make filling and other polymeric additions possible and exceptional, as well as extrusions more homogenous to assist the plug flow rheology of this system. As a part of this example, one part of coagulated dispersion resin is added to 20 parts of lubricant, such as Isopar H manufactured by Exxon®, containing 1 percent of carbon black as a marker. The mixture is sheared by a stirrer with a tip speed of 2000 feet per minute for 1 minute at ambient temperature. The sheared mixture is then poured into a vacuum filter to remove excess liquid. A sheet of thin rubber is then placed over the filter and pressed into the filter cake to prevent air from passing around the filter cake edges, which also helps to maintain a uniform lubricant level within the filter cake. When 18% of the liquid remains, the cake is removed and charged to the extruder barrel and the extrusion completed as in Example I.

Microscopic examination of the sintered extrudate, as in Example I, shows a homogenous mix of filler particles with the colloidal PTFE particles uniformly dispersed. It is difficult to ascertain any area domains free of filler such as seen in Example I.

EXAMPLE III

This example demonstrates that filled laminate can readily be extruded in tubing form. Three filter cakes of filled compositions containing 30 percent mica, 25 percent graphite and 100 percent PTFE were prepared according to the procedure of Example II. To gain handling strength, each cake is rolled uniaxially to elongate the cake to form a strip that can be wound around the extrusion mandrel. Each strip of rolled filter cake containing fillers is wrapped in the order desired until the mandrel plus multiple wraps will fit snuggly inside the barrel of the extruder. The triple layered lay up is then extruded, dried and sintered. Microtomed cross sections of the tubing reveal a multi layered laminate of mica, PTFE and graphite. A similar extrusion of fiberglass, PTFE and graphite was also processed. There is excellent adhesion between layers even after flexing. The composite composition is homogenous. The laminate layers appear in the same order as wrapped around the mandrel.

EXAMPLE IV

This example demonstrates the transformation of uniaxially-oriented hydrostatic coalescible extrudate to planar biaxial oriented tubing utilizing the resin preparation procedure described in Example II.

A 4-inch length of hydrostatic coalescible tubing extrudate ⅞-inch diameter is cut for transverse rolling. A twelve-inch long rod, slightly smaller than the extrudate I.D., is inserted through the tube. Spacer shims are placed at either end of the tube to limit the rolling compression and to define the sheet thickness. In this example, three separate lengths of tubing extrudate were rolled to increase their diameters. Table I shows the tensile strength properties of the control and three rolled tubing lengths after drying and sintering. The tensile properties of the longitudinal and transverse tensile section are essentially equal when the longitudinal stress imparted by extrusion equals the stress introduced by transverse rolling. The sheet becomes biaxially-oriented, and the longitudinal and transverse tensile strengths are essentially equal and greater than 5,000 psi. The marked increase in transverse tubing strength can be a significant improvement where burst strength is critical. The principal stress in hydraulic hose under pressure is in the hoop direction where biaxial orientation is a distinct advantage over uniaxial orientation where transverse tensile properties are significantly less.

TABLE I

PROPERTIES OF Biaxially-oriented TUBING
(As Produced by Hand Rolling Extrudate)

| Diameter | | LONGITUDINAL* | | | TRANSVERSE* | | |
|---|---|---|---|---|---|---|---|
| Inches (Unsintered Tubing) | Sample No. | Tensile Strength psi | Yield Stress psi | Elongation % | Tensile Strength psi | Yield Stress psi | Elongation % |
| 0.88 Control | 4 | 4500 | | 350 | 3200 | 1690 | 350 |
| 1.27 Hand Rolled | 1 | 3690 | 1870 | 360 | 5010 | — | 380 |
| 1.91 Hand Rolled | 2 | 4720 | 1880 | 440 | 5120 | — | 350 |
| 4.14 Hand Rolled | 3 | 5700 | 2070 | 500 | 5850 | — | 420 |

TABLE I-continued

PROPERTIES OF Biaxially-oriented TUBING
(As Produced by Hand Rolling Extrudate)

| Diameter Inches (Unsintered Tubing) | Sample No. | LONGITUDINAL* | | | TRANSVERSE* | | |
|---|---|---|---|---|---|---|---|
| | | Tensile Strength psi | Yield Stress psi | Elongation % | Tensile Strength psi | Yield Stress psi | Elongation % |
| Property Improvement Sample 4 to 3 | | 26% | | 30% | 83% | | 20% |

NOTE:
Tensile properties after sintering at 380 degrees Centigrade
*Tensile Direction

EXAMPLE V

This example demonstrates methods for fabricating planar biaxially-oriented sheet, both filled and unfilled. The process described in Example II is employed to prepare the resin for extrusion. Very simply large diameter hydrostatic coalescible tubing extrudate is fabricated with or without fillers and additives. Instead of rolling the extrudate as tubing, the extrudate is slit longitudinally and rolled as a sheet similar to the procedure in Example IV. The resulting product of this example is essentially equal to that of Example IV.

EXAMPLE VI

This example demonstrates the most direct method of making biaxially-oriented sheet, either filled or unfilled, by the resin preparation method of Example II extruded directly as uniaxial oriented sheet followed by rolling or calendering the hydrostatic coalescible extrudate in the transverse direction until stresses are equal in all directions. The dried and sintered product displays biaxial orientation with physical properties equal in both longitudinal and transverse directions.

EXAMPLE VII

The hydrostatic coalescible biaxially-oriented sheet produced by any of the processes of this invention may be used as the starting material for forming a variety of shapes by simple compression, deep draw, vacuum, blowing or other suitable forming techniques.

EXAMPLE VIII

This example demonstrates the present invention's versatile use in manufacturing porous and asymmetric porous structures, including membranes for use in a wide variety of applications such as: filtration, matrix for catalyst support, fuel cell components and electronic components. The pore-forming ingredient for this application is a fugitive particulate filler material that can be removed by leaching, chemical reaction or thermal decomposition during PTFE sintering. The pore former particle size determines the pore size of the pore structure. The pore former and filler, if one or more is desired, is added first to the wetting liquid in the process described in Example II. The preferred amount of PTFE resin included is 20 percent by volume based on the solids amount added, which is sufficient to provide a strong biaxial matrix for the finished biaxial oriented matrix of the porous structure. The process of Example II is followed and the mixture is then processed according to Example V if a tubular form is desired. In order to produce sheet, the procedure of Example VI is followed. After the pressure coalescible structure is complete, the structure is dried and sintered at 380 degrees Centigrade. After sintering, the filler is removed from the structure. If the fugitive filler is sodium chloride, water is used. However, if the fugitive filler is calcium carbonate, dilute hydrochloric acid is used and finally washed clean with water. Ammonium chloride, ammonium carbonate and polymethylmethacrylate all will decompose during the sintering process. Membranes made by this invention have a calculated tensile strength of 5,000 psi when the percentage of PTFE is considered (i.e. the 20 percent PTFE matrix will have a tensile strength of 5,000 psi).

EXAMPLE IX

This example is to demonstrate the use of this invention to produce asymmetric filters with controlled pore size in a laminate structure to provide improved filtering performance in the removal of particulate material. A porous structure is prepared according to Example VIII wherein only three different pore size compositions are prepared: one containing a fugitive pore former with an average particle size of 10 microns, one with 5 micron particle size and one with 1 micron particle size. The three hydrostatic coalescible compositions are processed according to procedure described in Example III while the extrudate is processed according to the process of Example V to produce a tube which is then dried and sintered. Finally, the fugitive pore former is removed as described in Example VIII.

Microtomed cross sections of the tubing reveal three distinct porous layers with their respective pore size essentially equal to the pore former particle size added to each composition.

EXAMPLE X

This example demonstrates making an asymmetric filter with controlled pore size by preparing two or more compositions containing calcium carbonate of different particle size according to Example II and then processing the hydrostatic coalescible extrudate of each separately by Example VI. While still in the hydrostatic coalescible state, each composition is plied and pressed together at pressure of 1,000-psi. Up to 300 degrees Centigrade if heat is also applied. The laminate is dried till free of lubricant and then sintered by infrared or oven at a temperature of 380 degrees Centigrade for 15 to 20 minutes. The calcium chloride is removed by diluted hydrochloric acid and washed until free of acid.

Microtomed cross sections reveal porosities, which replicate the size of the particles added as filler to each laminant layer.

EXAMPLE XI

This example demonstrates forming by compression by employing a matched mold. The part is comprised of a dish with flat bottom, tapered sides, flat lip and wall cavity of 0.040 inch when closed. The biaxially-oriented pressure coalescible material to be reshaped is a sheet made by the procedure described in Example VI. A circular section of this sheet is clamped around the top circumference of the mold to ensure that draw down into the mold will be uniform. The compression rate for draw down is very slow to allow the wetting lubricant and air to escape, especially during the final steps of compression. The temperature for all operations should be above 30 degrees Centigrade. Once the part has been formed, the temperature of the mold may be raised gradually to as high as 300 degrees Centigrade to assist removal of lubricant. Alternate periods of heat and compression will also help the lubricant to escape. In addition, partial removal of the male die will also facilitate lubricant evaporation. When the part is essentially lubricant free, it may be removed from the mold for more complete drying at temperatures up to 300 degrees Centigrade. Once completely dry, the part should be returned to the heated mold and compressed to consolidate the part and eliminate any incidental voids that remain. The formed part is then free sintered at 380 degrees Centigrade for 10 to 15 minutes. The part is form stable and has a good appearance. A porous metal die or weep holes placed in strategic locations might solve many of the lubricant removal problems encountered.

EXAMPLE XII

This example employs the same mold pair as Example XI, but the hydrostatic pressure-coalescible material for feedstock is cut into 4-inch discs, which are stacked snuggly into the bottom mold to a thickness of 0.270 inch. When pressure is applied, the discs will extrude upward, expanding circumferentially to fill the mold cavity. Sufficient material was provided to allow for a small amount to extrude at the top flange.

After the part was formed, the mold was heated to expel lubricant and to dry the formed shape. When essentially dry, the molded part was removed from the mold and heated up to 300 degrees Centigrade to remove the last traces of lubricant. When completely dry, the part was placed back into the mold and compressed to eliminate possible voids and to further consolidate the molding. The part was removed from the mold and free sintered at 360 degrees Centigrade for 10 to 15 minutes. Table II provides shrinkage data for the bottom, wall and top (flat lip) of several of the parts formed, as well as the compositions of all parts formed. It is surprising that parts are all form stable after free sintering.

TABLE II

| Sample Composition | *Lubricant % Feed Stock | **Total Shrinkage % Bottom A | Wall B | Top C |
|---|---|---|---|---|
| 1. "Teflon" 6 | 18 | 22 | 14 | 13 |
| 2. 30% Mica 70% "Teflon" 6 | 18 | 10.5 | 3 | 5 |
| 3. 30% Bronze 70% "Teflon" 6 | 18.5 | 10.5 | 8.5 | 2 |
| 4. 25% Fiberglas 75% "Teflon" 6 | 17 | 12 | 6 | 6 |
| 5. 30% Bronze 70% "Teflon" 6 10 mils (outside)*** "Teflon" 6 30 mils (inside)*** | | 10.5 | 8.5 | 6.5 |
| 6. 30% Bronze 70% "Teflon" 6 30 mils (outside)*** "Teflon" 6 10 mils (inside)*** | | 12 | 6 | 6.5 |

*Weight percentage in feedstock.
**Total percentage of shrinkage for each dimension based on the original mold dimension.
***Wall thickness of all parts is 40 mils.

The compositions evaluated in the table were chosen to represent different particulate forms and lamination schemes as shown below.

Sample 1 is unfilled "Teflon" 6 shrinkages were always greater without fillers.

Sample 2 contains 30 percent Mica (platelets)

Sample 3 contains 30 percent Bronze (particulate)

Sample 4 contains 25 percent Fiberglas (chopped fibers)

Sample 5 contains a 10 mil outer layer of 30 percent Bronze and 70 percent "Teflon" 6 and an inner layer 30 mils thick of "Teflon" 6 (lamination)

Sample 6 contains a 30 mil outer layer of 30 percent Bronze, 70 percent "Teflon" 6 and an inner layer 10 mils thick of "Teflon" 6 (lamination)

The data show higher shrinkage when fillers are not included. Compositions containing either fibers or platelets show lower shrinkage. In addition to the above compositions "parts" were successfully formed containing 25 to 30 percent of mica, fiberglas and graphite and laminated combinations of each, however, shrinkage data is not available. All parts formed were form stable with an excellent appearance and a smooth homogenous texture.

Note: With the equipment available Example XII was preferred because the results were more reproducible.

EXAMPLE XIII

This example demonstrates the fabrication of a shaft seal post-formed from two hydrostatic pressure coalescible sheet compositions produced according to Example VI. Discs 1.12-inch diameters, 0.04 inch thick, were die cut from the above sheet. Two compositions were evaluated: one unfilled "Teflon" 6 and one containing 25 percent Beta Fiberglas and 75 percent "Teflon" 6. A hole 0.175 inch in diameter was die cut from the center of each of 5 discs; one set was prepared for each composition.

The die cut discs were held firmly around the outer perimeter while a tapered mandrel was passed through the center of each hole until the full diameter of the tool, 0.625 inch, passed through each to flare and form the lip seal.

The formed seal was dried in a circulating air oven at 150 to 200 degrees Centigrade for 15 to 20 minutes and then free sintered at 360 degrees Centigrade for 10 minutes. Shaft seals were form stable and displayed a smooth homogeneous texture. Table III shows the shrinkage by dimension after free sintering.

TABLE III

Shaft Seal Shrinkage after Sintering*

|  | "Teflon" 6 | 25 Percent Fiberglas |
|---|---|---|
| Height | 20 +/− 4% | 8 +/− 4% |
| O.D. | 16 +/− 3% | 8 +/− 4% |
| Thickness | 16 +/− 2% | 8 +/− 4% |

Note:
Data above are based on five samples of each composition
*Shrinkages are determined from wet die cut rings and compared to the finished sintered part. The tooling size employed in this example is shown in Table IV of Example XIV under Step No. 5.

EXAMPLE XIV

This example demonstrates forming of shaft seals made from biaxially-oriented sintered sheet. Shaft seals were made by the art process and were formed from unfilled sintered skived (shaved) sheet. Tooling is similar to that described in the last example. Rings were die cut with 1.12 inch O.D. and a hole corresponding to the sizes shown in the Table ranging from 0.362 to 0.175 inch. The art process sheet stock was skived from a billet made from quality granular PTFE. A corresponding set of rings was prepared from sintered sheet containing 30 percent graphite (Acheson GP 38) and 70 percent "Teflon" 6 prepared according to the process of Example VI. Shaft seals were formed as in the last example for comparison. Shaft seals could not be formed beyond step No. 3 when formed from skived art processed sheet without tearing and cracking. Shaft seals made by the process of this invention could easily be formed to and including step No. 5. Even after step No. 5, forming the die cut lip remained smooth and there were no signs of cracks forming. Table IV lists dimensional changes due to forming.

TABLE IV

Shaft Seal Forming Tool Parameters

| Step No. | Forming Shaft O.D. Inch | Original Center Hole Diameter | *Circumference Enlargement, % |
|---|---|---|---|
| 1 | 0.625 | 0.362 | 73 |
| 2 | 0.625 | 0.314 | 99 |
| 3 | 0.625 | 0.272 | 129 |
| 4 | 0.625 | 0.223 | 180 |
| 5 | 0.625 | 0.175 | 257 |

*Percentage enlargement due to circumferential stretching by the forming tool.

The quality of the sintered biaxially-oriented graphite filled shaft seals was superior to the shaft seals formed from the art skived unfilled sheet, demonstrating that filler and reinforcements may be added by this invention without any loss of quality. Excellent shaft seals were fabricated from other sheet compositions made according to the process of this invention.

EXAMPLE XV

This example demonstrates the forming of complex shapes that do not require deep draw. For this example, a 8-inch diameter diaphragm is formed in matching die halves to form a 0.060-inch thick part with three concentric ribs approximately one inch deep. Hydrostatic coalescible biaxially-oriented sheet made according to Example VI is the stock for this example. A disc of the stock is placed in the mold and compressed slowly with a final dwell time of about one minute, longer for the thicker parts, with adequate time for lubricant to escape. The part is removed from the die and dried until free of lubricant and then free sintered at 360 to 380 degrees Centigrade for no longer than 15 minutes. The finished part is form stable and biaxially-oriented. Parts were formed from both filled and unfilled stock. All parts formed replicated the mold detail well and were of excellent quality.

Parts were also molded successfully from feedstock dried and free of lubricant. For these experiments, the mold was heated up to 300 degrees Centigrade to facilitate processing as heat has a plasticizing effect on the resin. However, the temperature should never exceed 300 degrees Centigrade until all molding and forming has been completed.

EXAMPLE XVI

This example demonstrates the expansion of tubular pressure coalescible extrudate by blowing to impart biaxial orientation. The tubing is processed according to Example V. However, the tubing is not expanded by rolling, as in Example V, but rather by air pressure applied to the I.D. of the length of extrudate. To assist in the control of the blowing process, a length of expandable rubber tubing is placed inside the pressure coalescible tube, plugged at one end to contain the air. At the opposite end of the tube, air is fed in at a controlled moderate rate to expand the extrudate into a larger diameter tube to limit the expansion and to determine the final expanded dimension of the biaxially formed tube. Once the expansion is completed, the air pressure is maintained and the formed biaxial tube dried, the rubber tube is removed and the tube is sintered at 360 to 380 degrees Centigrade for no longer than 15 minutes. The starting O.D. diameter of the extrudate was 0.88 inch after expansion by blowing, drying and sintering the O.D. diameter was 4.00 inches. The resulting product was biaxially-oriented, since the tensile strength in both the longitudinal and transverse directions is equal and greater than 5,000 psi.

EXAMPLE XVII

This example demonstrates the ability of a biaxially-oriented tube to become heat shrinkable and to restore the memory phenomenon fluoropolymers have become noted for. Once the molecular structure is sintered (fused), the molecules become interconnected and can no longer act independently as in the hydrostatic coalescible state where molecules are free to slide around freely without memory. In the interconnecting locked state memory is restored if stretching occurs.

In this example, lengths of biaxially-oriented sintered tubing made according to Example V and Example XVI are expanded by commercial art methods and then frozen as expanded only to be shrunk later when heated to or above that expansion temperature. Expansion and recovery were demonstrated successfully with both filled and unfilled tubing compositions. Heat shrinkable filled fluoropolymer compositions are not available in any resin form. Selected fillers might have added functionality, such as silicon carbide for abrasion resistance, carbon or graphite for static dissipation and polymeric additives for property improvement.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification.

I claim:

1. A method of processing colloidal size polytetrafluoroethylene resin particles by plug flow in an unmelted state while in a hydrostatic coalescible condition to produce biaxially-planar oriented structures comprising the steps of:
   a. releasing said colloidal size polytetrafluoroethylene resin particles from coagulated dispersion aggregates at high shear in a solvent to create a mixture, wherein said particles are approximately 5 to 10 microns in size and said solvent is capable of wetting polytetrafluoroethylene surfaces;
   b. subjecting said mixture to high shear mixing;
   c. filtering said mixture to retain approximately 17 to 20 percent liquid to form a hydrostatic pressure coalescible filter cake; and
   d. processing said filter cake, said processing step comprising
      i) first uniaxially paste extruding said filter cake composition to produce a uniaxial planar oriented polytetrafluoroethylene structure having longitudinal stress containing approximately 17 to 20 percent lubricant; and
      ii) applying a means of re-orienting said uniaxially planar oriented polytetrafluoroethylene structure containing approximately 17 to 20 percent lubricant approximately 90 degrees to the initial uniaxial extrusion direction, wherein said means of re-orienting imparts a transverse stress to said structure, wherein said means of re-orienting comprises a single step of re-orientation for a sufficient period of time so that the transverse stress imparted by said re-orienting and the longitudinal stress imparted by said uniaxial paste extrusion are about equal.

2. The method of claim 1 wherein the means of re-orienting is rolling.

3. The method of claim 1 wherein the means of re-orienting is calendering.

4. The method of claim 1 wherein the means of re-orienting is blowing.

5. The method of claim 1 wherein the means of re-orienting is re-extrusion.

6. The method of claim 1 wherein said biaxial planar oriented polytetrafluoroethylene structure is a sheet.

7. The method of claim 1 wherein biaxial planar oriented polytetrafluoroethylene structure is a tube.

8. The method of claim 1 further comprising:
   e) slitting said biaxial planar oriented polytetrafluoroethylene tubular structure; and
   f) laying open said structure to form a sheet.

9. The method of claim 1 further comprising the step after step b of:
   c. adding solid particles approximately less than 25 microns in size during mixing to consist of up to 90 percent of a total solids volume.

10. The method of claim 6 wherein said subjecting step further comprises adding solid particles approximately less than 25 microns in size during mixing to consist of up to 90 percent of a total solids volume, said means of re-orienting is rolling; and
    laminating said rolled biaxial planar oriented polytetrafluoroethylene structure by compression.

11. The method of claim 6 wherein said means of re-orienting is calendering, wherein said subjecting step further comprises adding solid particulates approximately less than 25 microns in size during mixing to consist of up to 90 percent of a total solids volume, and laminating said calendered biaxial planar oriented polytetrafluoroethylene structure by compression.

12. The method of claim 6 wherein said means of re-orienting is re-extrusion, wherein said subjecting step further comprises adding solid particulates approximately less than 25 microns in size during mixing to consist of up to 90 percent of a total solids volume, and laminating said re-extruded biaxial planar oriented polytetrafluoroethylene structure by compression.

13. The method of claim 10 wherein said compression is at a pressure ranging from 100 to 1,000 psi.

14. The method of claim 11 wherein said compression is at a pressure ranging from 100 to 1,000 psi.

15. The method of claim 12 wherein said compression is at a pressure ranging from 100 to 1,000 psi.

16. The method of claim 10 further comprising applying heat up to 300 degrees Centigrade to the laminated, rolled biaxial planar oriented PTFE structure to plasticize and assist the forming and shaping of the sheet.

17. The method of claim 11 further comprising applying heat up to 300 Centigrade to the laminated, calendered biaxial planar oriented PTFE structure to plasticize and assist the forming and shaping of the sheet.

* * * * *

UNITED STATES PATENT AND TRADEMARK OFFICE
CERTIFICATE OF CORRECTION

| | | |
|---|---|---|
| PATENT NO. | : 7,060,210 B2 | Page 1 of 1 |
| APPLICATION NO. | : 10/810763 | |
| DATED | : June 13, 2006 | |
| INVENTOR(S) | : Robert Roberts | |

It is certified that error appears in the above-identified patent and that said Letters Patent is hereby corrected as shown below:

Column 3,
Line 36, "theologically" should read -- rheologically --.

Column 14,
Line 3, "The method of claim 1" should read --The method of claim 7--.
Line 46, "300 Centigrade" should read --300 degrees Centigrade --.

Signed and Sealed this

Thirtieth Day of January, 2007

JON W. DUDAS
*Director of the United States Patent and Trademark Office*